(12) United States Patent
Moreno Levy

(10) Patent No.: US 11,909,462 B2
(45) Date of Patent: Feb. 20, 2024

(54) SELF-POWERED SEMI-ACTIVE ELECTRONIC TAG WITH AUTONOMOUS PROCESSING CAPABILITY AND ITS COMMUNICATION PROCEDURE

(71) Applicant: YOCTO TECHNOLOGIES, S.L., Madrid (ES)

(72) Inventor: Danny Moreno Levy, Madrid (ES)

(73) Assignee: YOCTO TECHNOLOGIES, S.L., Madrid (ES)

( * ) Notice: Subject to any disclaimer, the term of this patent is extended or adjusted under 35 U.S.C. 154(b) by 711 days.

(21) Appl. No.: 17/046,988

(22) PCT Filed: Jan. 22, 2019

(86) PCT No.: PCT/IB2019/050516
§ 371 (c)(1),
(2) Date: Oct. 12, 2020

(87) PCT Pub. No.: WO2019/197909
PCT Pub. Date: Oct. 17, 2019

(65) Prior Publication Data
US 2021/0174282 A1 Jun. 10, 2021

(51) Int. Cl.
*H04B 7/02* (2018.01)
*H04B 7/024* (2017.01)
(Continued)

(52) U.S. Cl.
CPC ............. *H04B 7/02* (2013.01); *H04B 5/0025* (2013.01); *H04B 5/0031* (2013.01);
(Continued)

(58) Field of Classification Search
CPC ....................................................... H04B 7/02
See application file for complete search history.

(56) References Cited

U.S. PATENT DOCUMENTS

2011/0121065 A1* 5/2011 Shahidzadeh ...... G06Q 10/0833
235/375
2013/0268357 A1* 10/2013 Heath .................... G06Q 10/10
726/26
(Continued)

FOREIGN PATENT DOCUMENTS

WO 2007068002 A2 6/2007

OTHER PUBLICATIONS

International Search Report for PCT/IB2019/050516, prepared by the European Patent Office, dated Jul. 7, 2019, 3 pages.
(Continued)

*Primary Examiner* — Joseph H Feild
*Assistant Examiner* — Pameshanand Mahase
(74) *Attorney, Agent, or Firm* — Brooks Kushman P. C.; John E. Nemazi

(57) ABSTRACT

Self-powered semi-active electronic tag with autonomous processing capacity and its communication procedure having a semi-active electromagnetic auto-feeding electronic device (nanochip) (without the use of batteries). It has autonomous processing capacity and direct two way intercommunication with another device of the same type and with Wifi communication, Bluetooth, (or similar) to Internet (IoT) for connection via Wifi/Bluetooth, or similar, to Internet with blockchain. It is able to identify transactions machine to machine or machine to user, developed with nanotechnology techniques applicable to any industrial product and even living beings and whose process is carried out in three stages. It is capable of generating its own chain of custody, processing and transmitting information and notifications between tags and between these and authorized networks.

19 Claims, 1 Drawing Sheet

(51) Int. Cl.
*H04W 4/80* (2018.01)
*H04B 5/00* (2006.01)
(52) U.S. Cl.
CPC ......... *H04B 5/0037* (2013.01); *H04B 5/0056* (2013.01); *H04B 7/024* (2013.01); *H04W 4/80* (2018.02)

(56) References Cited

U.S. PATENT DOCUMENTS

2018/0096175 A1* 4/2018 Schmeling ............ G06F 1/3206
2019/0180291 A1* 6/2019 Schmeling ............ G16H 20/10

OTHER PUBLICATIONS

Feng Tian: "A supply chain traceability system for food safety based on HACCP, blockchain & Internet of things", 2017 International Conference on Service Systems and Service Management, IEEE, Jun. 16, 2017 (Jun. 16, 2017), pp. 1-6, XP033134073, DOI: 10.1109/ICSSSM.2017.7996119.

* cited by examiner

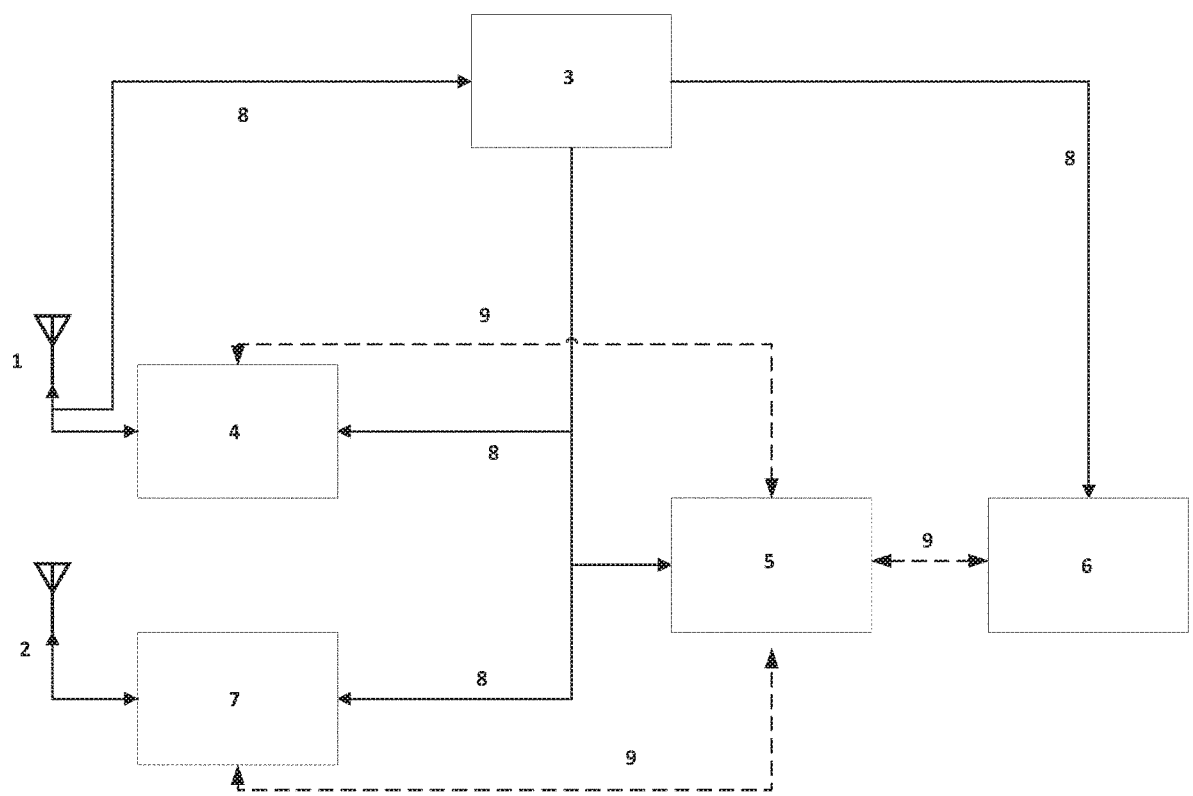

SELF-POWERED SEMI-ACTIVE ELECTRONIC TAG WITH AUTONOMOUS PROCESSING CAPABILITY AND ITS COMMUNICATION PROCEDURE

CROSS-REFERENCE TO RELATED APPLICATIONS

This application is the U.S. national phase of PCT Application No. PCT/IB2019/050516 filed on Jan. 22, 2019, which claims priority to ES Patent Application No. 201800092 filed on Apr. 13, 2018, the disclosures of which are incorporated in their entirety by reference herein.

PURPOSE OF THE INVENTION

This invention consists of an electronic device (nanochip) made up of semi-active, self-powered electronic tags (without the use of batteries), with autonomous processing capacity and its direct two way communication procedure with another device of the same type and with communication via Wifi (or similar) to the Internet (IoT) for connection via Wifi/Bluetooth/Internet with blockchain, capable of identifying machine-to-machine or machine-to-user transactions, developed with nanotechnology techniques applicable to any industrial product and even living beings and whose process is developed in three stages. A device capable of generating its own chain of custody, processing and transmitting information and notifications between tags and between these and authorised networks.

FIELD OF APPLICATION

This invention belongs to the sector of passive electronic tags (electronic tags that do not use batteries) and active ones (that require batteries for their operation) or semi-active ones like this one, used for recording, reading, writing, storage and exchange of data and information limited to the field of nanotechnology.

Electronic tags are understood to be elements that are attached, placed or embedded in another object, without limitations of type of material and/or size; that contain and transmit data and/or information.

BACKGROUND OF THE INVENTION

There are currently electronic tags classified as active, semi-active and passive. The active and semi-active tags use batteries, except in this invention that although being semi-active does not require batteries, while the passive ones require an external source of energy to carry out the transmission of information.

Passive electronic tags are read and/or read-write and are mainly used for object identification; in no case do they have any processing capacity. However, they do not communicate with each other and require the installation of a reading device infrastructure to retrieve the information.

Semi-active electronic tags are also read and/or read-write, but have a battery that allows them a greater range in communication. Since batteries lose effectiveness over time, the transmission of information is affected, which in turn decreases their reliability. This invention constitutes a semi-active electronic tag but without batteries, which has not existed in the market until now.

Active electronic tags have batteries and allow the writing, reading, storage, and exchange of data and information, but as they depend on batteries they have a limited life time, a high cost and a high environmental impact. As in the case of semi-active ones, as they depend on an internal source of energy which runs down, their reliability is lessened and the availability of information is not guaranteed.

Until now all passive, semi-active and active electronic tags have required reading devices to record and obtain information and data. It has only recently been possible to communicate between tags as long as they have a battery, in other words, they have needed to be active tags, which makes them expensive compared to passive tags, and they have a negative impact from an environmental cost perspective.

In the case of the novel application proposed here, which is a semi-active tag, which performs operations of recording, reading, writing, processing, storage and exchange of data and information without the use of batteries, using electromagnetic energy from external sources, which allows you to be connected as long as there is electromagnetic energy and to perform the transactions ordered or stored so that when you have an Internet connection, such information can be transmitted.

DESCRIPTION OF THE INVENTION

| | Definition of terms |
|---|---|
| Contract: | it is an electronic contract understood as the conditions provided and stored in the memory that must be met for the transaction to be executed. |
| Transaction: | these are the orders emitted by the processor once the pre-established conditions in the electronic contract stored in the memory have been validated or, if appropriate, contracted with the information coming from blockchain. |
| Blockchain: | this device and procedure may operate with private, semi-private and/or public blockchains. |
| IoT: | Nomenclature referring to the Internet of things. |
| Biometric token: | a unique identification code generated from the user's biometric identification processing, without storing captured biometric data, maintaining privacy and security. |
| Nanochip: | an electronic component whose subcomponents of the integrated circuit are in the order of nanometres. |
| Semi-active device: | this characteristic refers on the one hand to the capacity of activation of the tag at the moment of receiving an electromagnetic signal and, on the other hand, we call the tag semi-active because it is only activated in cases where the received signal is recognised and accepted by the processor and memory to execute the transaction which corresponds to a microcontract. |
| Microcontract: | these are the pre-programmed conditions stored in the memory or in blockchain, which the processor recognises and validates to carry out the tag transaction. |
| Generic readers: | they are network communication devices for general non-specific use such as access point devices, Wifi and Bluetooth among others. |

It is a tagging system by means of a semi-active electromagnetic auto-feeding electronic device (nanochip) (without the use of batteries), used for recording, reading, writing, processing, storing and exchanging data and information, capable of communicating with another of the same type by means of a proprietary communication protocol; the device is composed,
Of two antennas
A nanochip device, which in turn is composed of
    Two electromagnetic modules, A harvesting and energy storage module,
A processing module and communication protocol
A memory module As shown in FIG. 1, the electronic tag is composed of:

1. Antenna (1): It is a dual-function device: for the capture and coupling of the electromagnetic signal that is in the air, with Ule harvesting and energy storage module for the transmission and emission of data to Wifi, Internet and blockchain through the EM module (4).

2. Electromagnetic module EM (4) comprising: A demodulation module that is responsible for extracting information from the carrier signal which arrives or is received via Wifi/Bluetooth/Internet and a modulation module that is responsible for inserting the information into the carrier signal for transmission to the processor (5).

3. Harvesting and energy storage module (3): It is responsible for extracting energy from the arriving electromagnetic signal received through the antenna (1) to feed the electronic circuits of the device.

4. Processing module (5): It processes all the functions of the nanochip through a proprietary piece of software and takes care of:
   processing the information demodulated by the EM module (4) validating the latter with the pre-programmed data stored in the memory by means of these functions:
   it identifies the issuer of the requesting device.
   it validates the issuer.
   it searches the memory for the corresponding transaction.
   it performs two way communication with Wifi and/or Bluetooth, Internet, blockchain and/or its counterpart tag.
   It stores the transaction in the memory.
   It fulfils the security function by encrypting data and authentication by validating two counterpart tags through a proprietary communication protocol, or in case of user intervention, through a biometric token.

Type of transaction, it validates the transaction, transmits said information either to the EM module (4) for its transmission via Internet to blockchain or to the EM module (7) for two-way communication with its counterpart.

The device is versatile in the sense that it can carry out different functions according to the type of product or industry for which it is pre-programmed and applied.

The device is capable of processing multiple transactions almost simultaneously.

Thanks to the system of communication both with the reader via Wifi or Bluetooth and with the counterpart tags, the processor is able to select different types of generic readers allowing it, or those, which are authorised for the completion of the transaction, and simultaneously enabling efficiency with regards to a massive capacity for reading 100% of the tags.

Memory module (6): It stores information relevant to the transactions carried out by the device and Ule memory module is not susceptible to this information being violated since the only reading access is through the processor, which fulfils the already established security function. This module locally stores only those transactions that have not been sent to blockchain, always keeping the last two transactions locally.

6. Antenna (2)—it is a device whose function is the transmission and emission of data between counterparts to EM (7).

7.—Electromagnetic module EM (7): Demodulation module responsible for receiving and transmitting the information from the counterpart tags and transmitting it to the processor.

The procedure comprises:

A procedure for recording, reading, writing, processing, storing and exchanging data and information, through the following stages:

In the first stage, the electromagnetic wave, which contains energy and data, is captured by the first antenna (1) of the tag, which carries the wave simultaneously to the energy harvest module (3), which is responsible for providing energy to the various components of the electronic circuit and to the EM module (4), which is responsible for demodulating the carrier signal to obtain data and information.

Once the signal has been demodulated, the processing module (5) executes the different instructions, according to the established transaction rules (contract), and stores the information in the memory (6), thus capturing, processing and storing the transaction information coming from the service that generates the contract, allowing the execution of consecutive quasi-simultaneous transactions.

A second stage, for the execution of the transaction, according to the transaction rules, the processor (5) reads the data from the memory (6) and sends it to the EM module (7), which modulates the carrier frequency to be transmitted by the second Antenna (2) to the other tag of the same type, to establish the communication process. In this phase, the transaction between both tags is validated and confirmed based on the use of a secure communication protocol (proprietary) and an asynchronous protocol to confirm the execution of the transaction.

The third stage is the confirmation of Ule execution of Ule initial contract. For this purpose, the processing module (5) takes the data of the confirmed transaction from the memory module (6), sends it to the EM module (4) to modulate the carrier frequency and its corresponding transmission through the antenna (1) to the service that records the transaction.

BRIEF DESCRIPTION OF THE DRAWING

To complement the description being made and to support a better understanding of the semi-active electronic tag, in accordance with a preferred example of the practical implementation thereof, as an integral part of the description, the latter is accompanied by a drawing with an illustrative and non-limiting character, as shown in FIG. 1:

FIG. 1 is a semi-active electronic tag with stand-alone processing capability and communication with others of the same type.

Antenna (1): it is the coupling device of the electromagnetic signal with the electromagnetic module EM (4) that transmits and receives.

The electromagnetic module (4) comprises: a demodulation module that is responsible for extracting information from the carrier signal which arrives or is received and a modulation module that is responsible for inserting the information into the carrier signal for transmission.

Harvesting and energy storage module (3): it is responsible for extracting energy from the arriving electromagnetic signal to feed the electronic circuits of the device.

Processing module (5): it is responsible for processing the information demodulated by the stages of the procedure and in turn processes the information to be transmitted by the device, and sends and receives the information that is or will be stored in the memory.

Memory module (6): it stores information relevant to the transactions performed by the device.

The electromagnetic module (7) is connected to the antenna (2), Ule processing module (5) and the energy harvesting module (3).

Antenna (2): it is the device which couples the electromagnetic signal with the electromagnetic module (7) that transmits and receives the signal from the tag or counterpart electronic tag.

Power supply line (8)

Data line (9)

PREFERRED IMPLEMENTATION OF THE INVENTION

In view of the aforementioned FIG. 1 and in accordance with the numbering adopted for each component, an example of the preferred implementation of the invention can be seen in it, which includes the parts and elements that are shown and described in detail below:

1. The antenna (1) coupled to electromagnetic module (4) and the energy harvesting module (3).
2. The electromagnetic module (4) is connected to the antenna (1), Ule processing module (5) and the energy harvesting module (3).
3. The energy harvesting module (3) is connected to the electromagnetic modules (4) and (7), the processing module (5) and the memory module (6).
4. The processing module (5) is connected to the energy harvesting module (3), the electromagnetic modules (4) and (7) and to the memory module (6).
5. The memory module (6) is connected to the energy harvesting module (3) and the processing module (5).
6. The electromagnetic module (7) is connected to the antenna (2), the processing module (5) and the energy harvesting module (3).
7. The antenna (2) coupled to the electromagnetic module (7).

These components form an application-specific integrated circuit with the two connected antennas.

The invention claimed is:

1. A self-powered semi-active electronic tag with autonomous processing capacity configured to perform a communication procedure, which comprises a nanochip and antennas, an electromagnetic power supply, and is configured to perform a two way direct communication procedure with another device of the same type and to communicate via Wi-Fi/Bluetooth to the Internet to connect with a blockchain, identifying machine-to-machine or machine-to-user transactions, and whose process is carried out in three stages, wherein the electronic tag is capable of generating its own chain of custody, processing, and transmitting information and notifications between tags and between the latter and authorized networks;

the electronic tag comprising:
two receiving and transmitting antennas, of which a first antenna picks up and couples the electromagnetic signal that is in the air, with the harvesting and energy storage module and receives and transmits the data provided by an electromagnetic (EM) module through Wi-Fi/Bluetooth to the Internet and blockchain;
an electronic device which in turn comprises:
two (EM) modules,
a harvesting and energy storage module,
a processing module and communication protocol,
one memory module,
the communication procedure being for recording, reading, writing, processing, storing and exchanging data and information comprising three stages:
in the first stage, the electromagnetic wave, which contains energy and data, is captured by the first antenna of the tag, which carries the wave simultaneously to t harvesting and energy storage module, which is responsible for providing energy to the various components of the electronic circuit and to one EM module of the two (EM) modules, which is responsible or demodulating a carrier signal to obtain data and information; once the signal has been demodulated, the processing module executes the different instructions, according to established transaction rules, and stores the information in the memory, thus capturing, processing and storing the transaction information coming from a service that generates the transaction rules, allowing the execution of consecutive quasi-simultaneous transactions; said processing module has the capacity to execute intelligent transaction rules, interoperating with blockchain technologies; said processing module generates its own chain of custody, processing and transmitting information and notifications between tags and between these and authorized networks; wherein the transaction rules are conditions provided and stored in the memory that must be met for the transaction to be executed;
a second stage, for the execution of the transaction, according to the transaction rules, a processor reads the data from the memory and sends it to another EM module of the two EM modules, which modulates the carrier frequency to be transmitted by the second antenna to the other tag of the same type, to establish the communication process; in this stage, the transaction between both tags is validated and confirmed based on the use of a secure communication protocol and an asynchronous protocol to confirm the execution of the transaction; said processing module is capable of transmitting data and information grouped into blocks or transmission lines with its own encrypted communication protocol, without the need to use other data networks;
a third stage is the confirmation of the execution of the initial transaction rules; for this purpose, the processing module takes the data of the confirmed transaction from the memory module, sends it to the EM module to modulate the carrier frequency and its corresponding transmission through the first antenna to the service that records the transaction;
wherein the processing module is able to collect data regarding the conditions of the transaction rules in the memory and blockchain through the Wi-Fi/Bluetooth connection to the Internet from the EM module and the first antenna;
wherein the self-powered semi-active electronic tag is able to maintain by itself, a record of time and place of the transactions carried out, which allows for proper traceability.

2. The self-powered semi-active electronic tag with autonomous processing capacity configured to perform a communication procedure, according to claim 1, wherein a second antenna of the two receiving and transmitting antennas picks up and couples the electromagnetic signal that comes from the counterpart tag and transmits and receives the data to/from the processor.

3. The self-powered semi-active electronic tag with autonomous processing capacity configured to perform a communication procedure, according to claim 1, wherein the EM module demodulates and extracts the information from the carrier signal which arrives or is received and is responsible for inserting the information into the carrier signal for its transmission.

4. The self-powered semi-active electronic tag with autonomous processing capacity configured to perform a communication procedure, according to claim 1, wherein the harvesting and energy storage module is responsible for extracting energy from the electromagnetic signal, received through the first antenna at which it arrives, to feed the electronic circuits of the device.

5. The self-powered semi-active electronic tag with autonomous processing capacity configured to perform a communication procedure, according to claim 1, wherein the processing module has an autonomous processing capacity, without connecting to other networks or processing devices; processes all the functions of the nanochip using proprietary software and is responsible for processing the information demodulated by the two EM modules, validating them with the pre-programmed data stored in the memory or data available in blockchain or other servers,
  identifies the issuer of the requesting device,
  validates the issuer,
  searches the memory for the corresponding transaction;
  performs two-way communication through Wi-Fi/Bluetooth to Internet and blockchain and/or with its counterpart tag in a direct way;
  stores the transaction in the memory to upload it to blockchain and always keeps at least the last two;
  fulfills the security function by encrypting data and authentication by validating two counterpart tags through a proprietary communication protocol, or in case of user intervention, through a biometric token;
  type of transaction, it validates the transaction, transmits said information either to the EM modulate for its transmission via Internet to the blockchain or to the EM module for its two-way communication with a counterpart electronic tag;
  the device is capable of processing multiple transactions almost simultaneously;
  the system of communication both with the reader via Wi-Fi/Bluetooth and with the counterpart tags, the processor is able to select different types of readers enabling it, or those authorized for the completion of the transaction, simultaneously allowing efficiency with regards to a massive capacity for reading; and
  the processor being capable of generating its own chain of custody.

6. The self-powered semi-active electronic tag with autonomous processing capacity configured to perform a communication procedure, according to claim 1, the another electromagnetic module (EM), receives and emits the signal from a counterpart tag and transmits it to the processor in a two way manner.

7. The self-powered semi-active electronic tag with autonomous processing capacity configured to perform a communication procedure, according to claim 1, the memory module stores information relevant to the transactions made by the device and the self-powered semi-active electronic tag is not susceptible that such information is violated since the only reading access is through the secure processor.

8. The self-powered semi-active electronic tag with autonomous processing capacity configured to perform a communication procedure according to claim 1, wherein by being able to communicate with different frequency bands with a high level of security, when the self-powered semi-active electronic tag locates an authorized source of transmission to other networks.

9. The self-powered semi-active electronic tag with autonomous processing capacity configured to perform a communication procedure according to claim 1, wherein by not requiring specific reading hardware, making data capture possible through any of the generic devices available including Wi Wi-Fi, mobile phone, and Bluetooth.

10. The self-powered semi-active electronic tag with autonomous processing capacity configured to perform a communication procedure according to claim 1, wherein by being able to identify the user through a biometric token generating an identification code, without storing their biometric identification, through the artificial intelligence methodology of machine learning.

11. The self-powered semi-active electronic tag with autonomous processing capacity configured to perform a communication procedure according to claim 1, wherein in that this semi-active electronic tag, without the use of a battery, generates its own chain of custody, processing and transmitting information and notifications between devices and between devices and authorised networks; whenever there is electromagnetic power, the tag will remain active by permanently exchanging information.

12. The self-powered semi-active electronic tag with autonomous processing capacity configured to perform a communication procedure according to claim 1, wherein in that the electronic tag is able to ensure the traceability and security of each transaction.

13. A use of a self-powered semi-active electronic tag with autonomous processing capacity in a communication procedure, the semi-active electronic tag comprising a nanochip and antennas, an electromagnetic power supply, and is configured to perform a two way direct communication procedure with another device of the same type and to communicate via Wi-Fi/Bluetooth to the Internet to connect with a blockchain, identifying machine-to-machine or machine-to-user transactions, and whose process is carried out in three stages, wherein the electronic tag is capable of generating its own chain of custody, processing and transmitting information and notifications between tags and between the latter and authorized networks; the electronic tag comprising:
  two receiving and transmitting antennas, of which a first antenna picks up and couples the electromagnetic signal that is in the air, with the harvesting and energy storage module and receives and transmits the data provided by an electromagnetic (EM) module through Wi-Fi/Bluetooth to the Internet and blockchain;
  an electronic device which in turn comprises:
  two (EM) modules,
  a harvesting and energy storage module,
  a processing module and communication protocol,
  one memory module,
  the communication procedure being for recording, reading, writing, processing, storing and exchanging data and information comprising three stages:
  in the first stage, the electromagnetic wave, which contains energy and data, is captured by the first antenna of the tag, which carries the wave simultaneously to the harvesting and energy storage module, which is responsible for providing energy to the various components of the electronic circuit and to one EM module of the two (EM) modules, which is responsible or demodulating a carrier signal to obtain data and information; once the signal has been demodulated, the processing module executes the different instructions, according to established transaction rules, and stores the information in the memory, thus capturing, processing and storing the transaction information coming from the service that generates the transaction rules, allowing the execution of consecutive quasi-simultaneous transactions; said processing module has the capacity to execute intelligent transaction rules, interoperating with blockchain technologies; said processing module generates its own chain of custody, processing and transmitting information and notifications between tags and between these and authorized networks; wherein the transaction rules are conditions provided and stored in the memory that must be met for the transaction to be executed;

a second stage, for the execution of the transaction, according to the transaction rules, a processor reads the data from the memory and sends it to another EM module of the two EM modules, which modulates the carrier frequency to be transmitted by the second antenna to the other tag of the same type, to establish the communication process; in this stage, the transaction between both tags is validated and confirmed based on the use of a secure communication protocol and an asynchronous protocol to confirm the execution of the transaction; said processing module is capable of transmitting data and information grouped into blocks or transmission lines with its own encrypted communication protocol, without the need to use other data networks;

a third stage is the confirmation of the execution of the initial transaction rules; for this purpose, the processing module takes the data of the confirmed transaction from the memory module, sends it to the EM module to modulate the carrier frequency and its corresponding transmission through the first antenna to the service that records the transaction;

wherein the processing module is able to collect data regarding the conditions of the transaction rules in the memory and blockchain through the Wi-Fi/Bluetooth connection to the Internet from the EM module and the first antenna;

wherein the self-powered semi-active electronic tag is able to maintain by itself, a record of time and place of the transactions carried out, which allows for proper traceability.

14. The use of the self-powered semi-active electronic tag with autonomous processing capacity configured to perform a communication procedure, according to claim 13, wherein a second antenna of the two receiving and transmitting antennas picks up and couples the electromagnetic signal that comes from the counterpart tag and transmits and receives the data to/from the processor.

15. The use of the self-powered semi-active electronic tag with autonomous processing capacity configured to perform a communication procedure, according to claim 13, wherein the EM module demodulates and extracts the information from the carrier signal which arrives or is received and is responsible for inserting the information into the carrier signal for its transmission.

16. The use of the self-powered semi-active electronic tag with autonomous processing capacity configured to perform a communication procedure, according to claim 13, wherein the harvesting and energy storage module is responsible for extracting energy from the electromagnetic signal, received through the first antenna at which it arrives, to feed the electronic circuits of the device.

17. The use of the self-powered semi-active electronic tag with autonomous processing capacity configured to perform a communication procedure, according to claim 13, wherein the processing module has an autonomous processing capacity, without connecting to other networks or processing devices; processes all the functions of the nanochip using proprietary software and is responsible for processing the information demodulated by the two EM modules, validating them with the pre-programmed data stored in the memory or data available in blockchain or other servers, identifies the issuer of the requesting device, validates the issuer, searches the memory for the corresponding transaction;

performs two-way communication through Wi-Fi/Bluetooth to Internet and blockchain and/or with its counterpart tag in a direct way;

stores the transaction in the memory to upload it to blockchain and always keeps at least the last two;

fulfills the security function by encrypting data and authentication by validating two counterpart tags through a proprietary communication protocol, or in case of user intervention, through a biometric token;

type of transaction, it validates the transaction, transmits said information either to the EM modulate for its transmission via Internet to the blockchain or to the EM module for its two-way communication with a counterpart electronic tag;

the device is capable of processing multiple transactions almost simultaneously;

the system of communication both with the reader via Wi-Fi/Bluetooth and with the counterpart tags, the processor is able to select different types of readers enabling it, or those authorized for the completion of the transaction, simultaneously allowing efficiency with regards to a massive capacity for reading; and the processor being capable of generating its own chain of custody.

18. The self-powered semi-active electronic tag with autonomous processing capacity configured to perform a communication procedure, according to claim 13, the another electromagnetic module (EM), receives and emits the signal from a counterpart tag and transmits it to the processor in a two way manner.

19. The self-powered semi-active electronic tag with autonomous processing capacity configured to perform a communication procedure, according to claim 13, the memory module stores information relevant to the transactions made by the device and the self-powered semi-active electronic tag is not susceptible that such information is violated since the only reading access is through the secure processor.

\* \* \* \* \*